(12) United States Patent
Heuft et al.

(10) Patent No.: US 6,755,298 B1
(45) Date of Patent: Jun. 29, 2004

(54) DEVICE FOR OUTWARD GUIDANCE OF ARTICLES TRANSPORTED ON A CONVEYER

(75) Inventors: Bernhard Heuft, Burgbrohl (DE); Hans-Ulrich Goller, Godesberg (DE)

(73) Assignee: Heuft Systemtechnik GmbH, Burgbrohl (DE)

( * ) Notice: Subject to any disclaimer, the term of this patent is extended or adjusted under 35 U.S.C. 154(b) by 0 days.

(21) Appl. No.: 09/508,145

(22) PCT Filed: Sep. 14, 1998

(86) PCT No.: PCT/EP98/05832

§ 371 (c)(1),
(2), (4) Date: Mar. 7, 2000

(87) PCT Pub. No.: WO99/14142

PCT Pub. Date: Mar. 25, 1999

(30) Foreign Application Priority Data

Sep. 12, 1997 (DE) .................... 297 16 459 U

(51) Int. Cl.⁷ .................. B65G 17/36; B65G 37/00
(52) U.S. Cl. .................. 198/370.07; 198/463.2
(58) Field of Search ............ 198/370.01, 37.002, 198/370.07, 436, 437, 463.2

(56) References Cited

U.S. PATENT DOCUMENTS

| | | | | |
|---|---|---|---|---|
| 3,073,444 A | * | 1/1963 | Bielinski et al. | 209/74 |
| 3,409,115 A | * | 11/1968 | Porcaro | 198/24 |
| 3,771,648 A | | 11/1973 | Revuelta | 209/74 R |
| 3,791,518 A | | 2/1974 | Vanderhoof | 209/74 R |
| 4,179,873 A | * | 12/1979 | Scudder | 56/328.1 |
| 4,194,614 A | * | 3/1980 | Hrivnak | 198/487 |
| 4,296,590 A | * | 10/1981 | Focke | 53/531 |
| 4,320,840 A | * | 3/1982 | Braschos | 209/523 |
| 4,441,604 A | * | 4/1984 | Schlig et al. | 198/598 |
| 4,501,365 A | | 2/1985 | Peyton et al. | 209/548 |
| 4,643,291 A | * | 2/1987 | Counter et al. | 198/356 |
| 4,738,347 A | * | 4/1988 | Brouwer et al. | 198/372 |
| 4,848,561 A | * | 7/1989 | Hinchcliffe et al. | 198/433 |
| 4,986,407 A | * | 1/1991 | Heuft | 198/367 |
| 5,054,601 A | * | 10/1991 | Sjogren et al. | 198/365 |
| 5,176,244 A | | 1/1993 | Radzins et al. | 198/430 |
| 5,868,239 A | * | 2/1999 | Bonnet | 198/370.02 |
| 5,887,699 A | * | 3/1999 | Tharpe | 198/367 |
| 5,971,132 A | * | 10/1999 | Bonnet | 198/370.07 |
| 5,988,356 A | * | 11/1999 | Bonnet | 198/598 |

FOREIGN PATENT DOCUMENTS

| | | | | |
|---|---|---|---|---|
| CH | 547218 | | 3/1974 | B65G/47/46 |
| DE | 3130308 A1 | | 2/1983 | B65G/47/52 |
| DE | 3327807 A1 | | 2/1984 | B65G/47/82 |
| DE | 3923100 C2 | | 4/1994 | B65G/47/34 |
| DE | 4315038 A1 | | 11/1994 | B65G/47/49 |
| DE | 9407563.8 | | 7/1995 | B65G/47/46 |
| DE | 19522217 A1 | | 1/1997 | B65G/47/46 |
| EP | 0003111 A1 | | 1/1998 | B65G/47/64 |

* cited by examiner

*Primary Examiner*—Jack Lavinder
*Assistant Examiner*—Melody M Burch
(74) *Attorney, Agent, or Firm*—Gardner Carton & Douglas LLP

(57) ABSTRACT

A conveyor for moving items may move synchronously with a number of diversion segments for a section and the diversion segments can be individually extended and retracted across the direction of transport, in order to push an item (10) off the conveyor (12). The diversion segments (22) are guided individually in extendable and retractable manner side by side in a carriage (18) in the direction of transport and the carriage (18) can be moved to and fro in the direction of transport. The carriage (18) is generally controlled such that it runs for a section roughly synchronously with the conveyor (12), the length of the section along which the carriage (18) plus the minimum interval between the items. A rail (26) that can be moved across the direction of transport can be provided, with which the diversion segments (22) can optionally be individually coupled.

6 Claims, 4 Drawing Sheets

DEVICE FOR OUTWARD GUIDANCE OF ARTICLES TRANSPORTED ON A CONVEYER

BACKGROUND OF THE INVENTION

The invention relates to a device and a method for diverting items which are transported on a conveyor. The items are pushed down from the conveyor by means of a diversion device which has one or more diversion segments, which can be moved along with the conveyor for a section and individually extended across the direction of transport.

Such devices are used e.g. in drinks filling plants to sort out defective containers, e.g. glass bottles, or incompletely filled or incorrectly closed containers. Such devices are known from CA-A-985213 and U.S. Pat. No. 3,791,518. The diversion segments are able to be displaced and are guided along a continuous track, being guided parallel and synchronously to the conveyor and guided back underneath the conveyor or laterally offset thereto. The extension of the individual diversion segments across the direction of transport takes place by a link motion.

A device is known from EP-A-0 003 111, for the lateral deflection of items which are transported on a conveyor, in which the deflection device is divided into a number of deflection segments which together form a continuous deflecting surface and can be individually extended. The items to be deflected are diverted along a fixed deflecting surface. They are then forcibly braked and light items in particular such as empty drinks bottles can thereby fall over. If the items are travelling in close succession, braking of the item to be diverted can also lead to accumulations of the following items.

SUMMARY OF THE INVENTION

The object of the invention is to reduce the mechanical expenditure which is necessary for the diversion of items which are transported on a conveyor.

Within the framework of the device according to the invention, this object is achieved in that the diversion segment(s) is (are) guided side by side in a carriage in the direction of transport and the carriage can be moved to and fro in the direction of transport.

The carriage is preferably controlled such that it runs along for a section roughly synchronously with the conveyor, the length of the section, along which the carriage runs synchronously with the direction of transport being shorter than the distance between the first and the last of the diversion segments guided in the carriage plus the minimum distance between the items.

Within the framework of the method according to the invention this object is achieved in that the diversion segments are arranged side by side in a carriage in the direction of transport, the carriage can be moved to and fro in the direction of transport, the length of the section along which the carriage moves with the conveyor is shorter than the distance between the first and the last of the diversion segments inside the carriage plus the minimum distance between the items, namely by the distance by which the conveyor moves on during the backward movement of the carriage, and the items are pushed in groups off the conveyor, each group beginning with a first item to be diverted and including all further items to be diverted which follow the first item to be diverted within a section the length of which equals the length of the movement of the carriage accompanying the conveyor.

The advantages that can be achieved through the invention consist in particular of the fact that a long, smooth diversion curve can be achieved through the synchronous movement of the diversion segments relative to the conveyor. The movement of the diversion segments in the direction of transport (X-direction) and across it (Y-direction) can be controlled separately so that both movement components are decoupled. The diversion curve can therefore be controlled without mechanical modifications and can be adapted to the stability, the weight or such other features of the items as well as to the speed of the conveyor. When there are no items to be diverted, then the carriage remains in its at-rest position, whereby wear is reduced compared with the diversion devices named at the beginning with synchronously running diversion segments guided on a continuous track.

The carriage can be guided to and fro in a frame in the direction of transport. The carriage is moved from an initial position at roughly the same speed as the conveyor alongside the conveyor (X-direction), so that during this forward movement of the carriage each diversion segment runs along essentially with a certain point of the conveyor and, by extending the diversion segment across the direction of transport (Y-direction), a container standing at this point can be pushed off the conveyor. All items to be diverted which are located within the length of the carriage are preferably pushed down simultaneously from the conveyor. The items transported on the conveyor are thus processed in groups. At the end of the forward movement, the carriage is returned to the initial position on the same path. The section covered by the synchronous forward movement is shorter than the distance between the first and the last diversion segment plus the minimum distance between the items by at least the piece by which the conveyor moves further within the time required for the return movement and to accelerate and brake the carriage.

This movement of the carriage is preferably controlled such that the carriage is at rest at the start or end of the diversion section. If there are one or more items to be diverted in the stream of items then the carriage initially moves, if it is in its at-rest position at the end of the diversion section, to the start of the diversion section. At the start of the diversion section the acceleration process is controlled such that the foremost diversion segment in the direction of transport reaches a position which is exactly congruent with the first item to be diverted. It is thereby guaranteed that the maximum number of diversion segments can be used for any following items to be diverted.

The extension movement (Y-direction) of the diversion segments and the choice of the diversion segments which are to be extended to divert the ascertained items, are particularly easy to carry out mechanically. The diversion segments can in general be extended and retracted in a horizontal direction. A vertically displaceable pin can be guided in the diversion segments, which projects upwards and downwards from the diversion segment. During the forward movement of the carriage a rail with a C profile which is open underneath is simultaneously moved back and forth in the Y-direction at a small distance above the diversion segments. The rail grips all the pins which are located in their upper position and thereby extends and again retracts the corresponding diversion segments during the forward movement of the carriage so that the front end of the diversion segments roughly describes a sine curve. The individual diversion segments are preferably chosen or activated during the return movement of the carriage. A single activator is sufficient for this, which is arranged underneath the carriage and presses the pins of the diversion segments, which are extended or retracted during the following forward movement, into the upper position. This can be effected by a lifting magnet, an air cylinder or an air jet. The use of an air jet as an activator is particularly easy. To this end, the lower end of the pins is somewhat widened to offer the air jet sufficient engagement surface.

If the time necessary for controlling and activating the individual pins noticeably slows down the return movement, then two activators can also be provided which are alternately assigned to the diversion segments so that the one activator activates the odd, and the other activator the even, diversion segments. There is also the possibility of extending and retracting each diversion segment by means of its own drive, e.g. a pneumatic cylinder. This would make the activators surplus. Although the device thereby becomes more expensive, this allows the diversion segments to be extended to varying degrees and the items to thus be diverted onto various paths.

The rail movable in Y-direction can be mounted on the carriage itself so that it also moves along with the carriage in X-direction, or it can be guided on the same frame as the carriage, the upper ends of the pins then sliding in the rail in X-direction. The latter design is mechanically simpler, as the drive for the Y-movement of the rail is then not carried by the carriage, but by the frame. A greater working speed also results from the lesser weight of the carriage.

The movement of the carriage and the movement of the rails are preferably each effected by a servo- or stepped motor via a chain or toothed belt, so that the position of the carriage and the rail can be exactly controlled at any time. The diversion curve on which the front end of an extended diversion segment engaging with the items moves can thereby be controlled precisely. A smooth diversion curve is preferred, i.e. smooth engagement with the items, relatively quick pushing-over of the items from the conveyor for example onto another conveyor running parallel to it, so that the items at no time lose contact with the diversion segment and thereby become labile. This is of particular importance for empty drinks bottles. Through this form of the diversion curve, the contact between the diversion segment and the item is furthermore gently broken, so that any eventual tipping back of the items is largely prevented here too. The diversion segments can thereafter be retracted as quickly as possible. At the end of the diversion movement of the carriage the pins of the individual segments are all brought into their lower position or other non-activation position. This can occur e.g. through a short downward movement of the rail.

The diversion onto various paths can also be effected by several devices arranged on or above the carriage, such as the previously mentioned rail, which move to and fro in Y-direction. The diversion segments are clicked into one of the devices during activation, according to the desired diversion curve. Various diversion routes can also be achieved by means of an individual device moving in Y-direction, each diversion segment having several activating pins, which then automatically disengage again at various extending positions and thereby lead to diversion paths of varying width.

Another possibility for activating the diversion segments is to house the diversion segments swivellable on an axis which is housed on the carriage pointing in X-direction and movable in Y-direction. In their at-rest, initial or non-activation position, all the diversion segments are directed vertically upwards and are held in this position by holding means, for example permanent magnets. To activate, the diversion segments concerned are detached from the holding means by air jets or strikers, so that they turn downwards in the horizontal. This choice or activation occurs again expediently during the return movement of the carriage. The axis can be moved forward and back in Y-direction similarly to the rail mentioned in the previous example and is located in the withdrawn position during the return movement of the carriage. During the diversion process, i.e. during the movement of the carriage in X-direction, the axis with the activated, horizontal and the non-activated, vertical diversion segments housed on it moves forward so that the activated, horizontal diversion segments engage with the items concerned and divert them. At the end of the diversion section, all the diversion segments are swivelled back into their at-rest position. This can occur for example by means of a linearly displaceable deactivation rail which extends parallel to the axis and engages with downward-directed extensions of the diversion segments. The deactivation rail can also be swivellable about the axis. To this end, radial fingers which entrain the diversion segments can also project from the axis and the axis can be rotatably housed so that, through a simple 90° rotation of the axis, the horizontally directed diversion segments can be tilted into their vertical at-rest position again.

The movement in Y-direction need not be rectilinear. It can also be a rotation movement by means of a shaft mounted in a fixed manner, i.e. not movable forwards and backwards, on the carriage. Activation of the diversion segments can also involve a coupling of the diversion segments concerned for a diversion process with the shaft in a rotation-resistant manner and the carrying out by the shaft of a rotation of for example 30° overall during the movement of the carriage in X-direction. In order that the ends of the diversion segments engaging with the items perform an horizontal as possible a movement, the shaft is to be arranged vertically above the path of the items.

The width of the individual diversion segments is preferably less than half the size of the items in the direction of transport, thus for drinks bottles half the diameter of the bottles. In this way, the vertex can be gripped in each case even when round items are travelling in close succession, by if necessary extending two successive diversion segments and thus preventing the item from slipping off from the segment. This means that either one or more diversion segments can be extended according to the relative position between item and diversion segment.

In the special situation where the items are transported in fixed grid, it is sufficient to provide a few segments in the same grid on the carriage. Such a situation occurs e.g. if drinks bottles are supplied by a screw conveyor or a star wheel and thereby stand in a fixed grid. The carriage then only needs to be provided with wide diversion segments corresponding to the grid.

The device according to the invention can also be used for so-called routing systems, in which items are distributed in groups onto a second transport device. It can be expedient in this case to provide one very wide diversion segment and a small number of narrower diversion segments, whereby the number of the items to be displaced can be chosen or adapted in each individual case.

Through the precise controllability of the extension and retraction movements of the diversion segments, e.g. more stable containers can be diverted at a greater speed so that they obtain a higher kinetic energy and do not come to a standstill immediately after being lifted or removed from the diversion segments, but move further along the conveyor in the diversion direction, because of their higher kinetic energy, after being lifted or removed from the diversion segments. The items can thereby be pushed as a whole further, across the direction of transport, than the extension width of the diversion segments.

In certain cases even a single diversion segment is sufficient for the diversion of items, e.g. if there is a space between the items. A single diversion segment can be sufficient especially if the items are very stable and thus can be greatly accelerated in Y-direction so that because of their inertia, they move even further in Y-direction after being lifted or detached from the diversion segment. Through the uncoupling of the X- and the Y-drive, different pulses can be imparted to individual items in Y-direction, so that a targeted distribution of the items onto several diversion paths is possible. The minimum distance between the items is determined by the diversion time and return time of the diversion segment. When using two or more diversion segments, the minimum distances between the items can be correspondingly smaller, the diversion curve can be flatter or the transport speed can be areater.

Finally, there is also the possibility to use two or more such carriages, used alternately in each case, instead of one carriage movable in X-direction. The carriages are arranged at different positions along the conveyor. The section along which each carriage can be moved to and fro in the direction of transport can also be longer than the distance between the first and the last diversion segment plus the minimum distance between the items of the carriage concerned. The several carriages can also be arranged vertically one above the other. The version with several carriages is particularly interesting for versions with a single diversion segment per carriage. Diversions onto several diversion paths are simplified where there are several diversion segments for each carriage.

There are various possibilities for the activation of the diversion segments. In addition to the already mentioned activation by pins, it is also possible to unfold the diversion segments for activation or to extend them from above or below into an activating position and then to start the diversion process again.

A very simplified possibility for a solid procedure for the diversion movement in Y-direction results from the use of a securely attached curve element through which the pins located in the activating position are guided. Separate drive for the movement of a rail in Y-direction can then be dispensed with. Another possibility is to connect the rails of the Y-drive to the X-drive via a curve control.

The front engagement surfaces can be both smooth and specially shaped, for example to support particularly labile items or containers. The front ends of the diversion segments can also be provided with suction cups which are correspondingly controlled to secure the containers during the diversion process and later release them again. Particularly labile items can also be guided between the diversion segments by two diversion segments directed against towards each other, the diversion devices of the conveyor sides facing each other being arranged. Another possible solution is to extend the diversion segments from the top downwards, each on the right- and left-hand side of an item, and to attach the diversion device above the items and then, after the diversion segments have been extended left and right, to displace these correspondingly in Y-direction and then to retract them again. In such versions, double diversions are also conceivable, the items then being fed centrally, the diversion segments dropping from above and the items being diverted by two rails or other devices for displacement in Y-direction in each case in one or the other direction.

In a special version, the front ends of the diversion segments can also be developed as a angle with one arm extending in the transport direction and one arm arranged at its front end across the direction of transport. The items then, as it were, run up against a stop and it is no longer necessary to move the carriage completely synchronously relative to the transport speed, but it can also travel at a reduced speed, so that neither an accumulation nor a guiding together of the items additionally takes place during the diversion process. It thereby becomes possible to guide together individual items which are arranged great distances apart on the first conveyor in a grid, onto a slower-running second conveyor for the diverted items. With suitably designed diversion segments, the carriage can also be moved at a greater speed than that of the conveyor, the items being able to be combined in groups.

BRIEF DESCRIPTION OF THE DRAWINGS

Embodiments of the invention are explained in the following using the diagram. There are shown in.

DETAILED DESCRIPTION OF THE INVENTION

Figure 1:
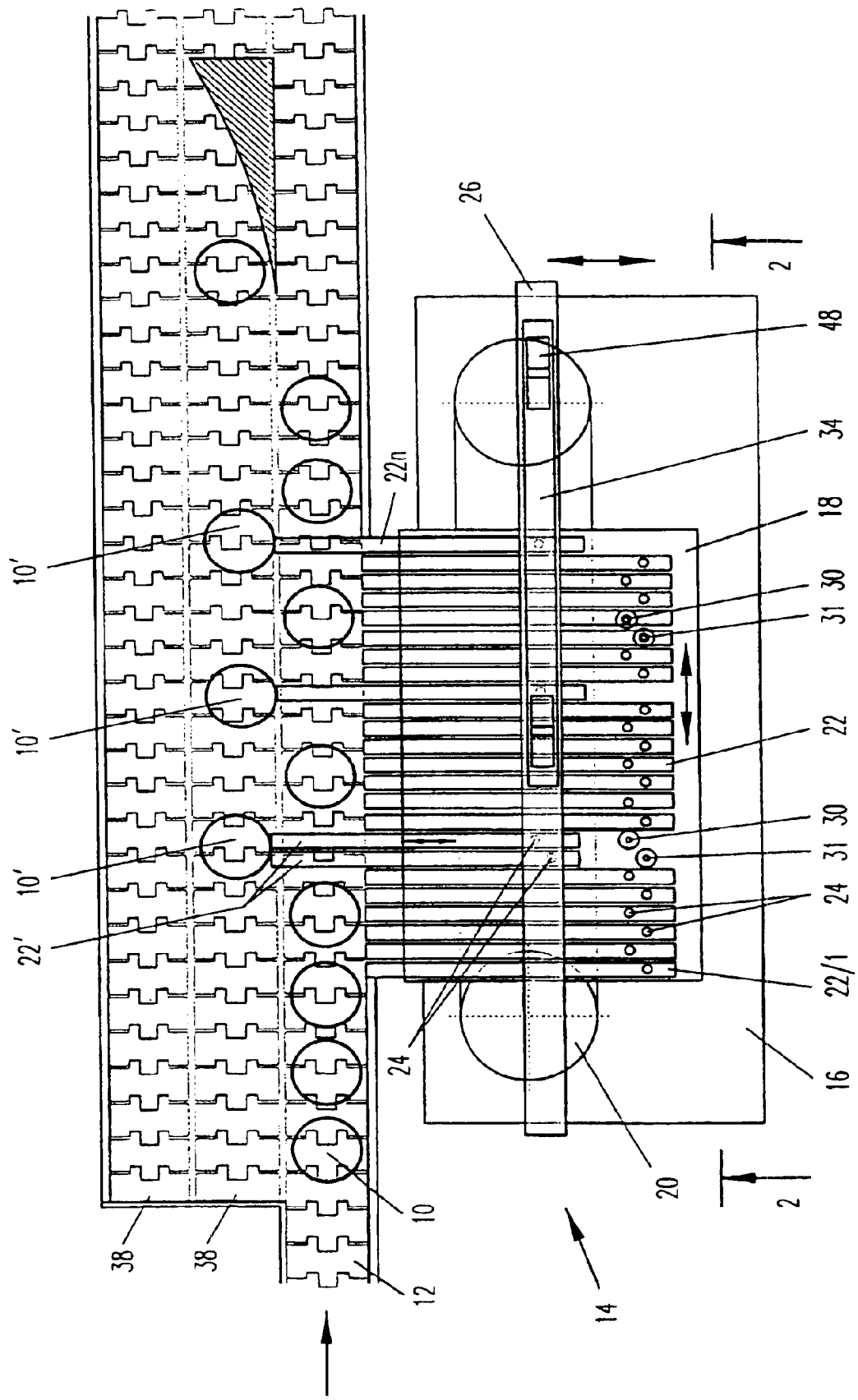
FIG. 1 in plan view, an embodiment of the device for diverting items with displaceable diversion segments.

In the embodiments shown, the transported items are drinks bottles 10 and the conveyor is a conveyor belt 12, e.g. a link chain conveyor. The bottles 10 are arranged on the conveyor belt 12 at irregular distances and are transported in the direction of the arrow. The bottles 10' are to be diverted from the row of bottles 10, as they have been identified as defective in an upstream inspection device.

A diversion device 14 is arranged directly next to the conveyor belt 12. The diversion device 14 has a frame 16 in which a carriage 18 is guided movable parallel to the direction of transport (X-direction). The carriage 18 is driven via a toothed belt by an X-drive 20, which contains a stepped or servomotor.

Figure 2:
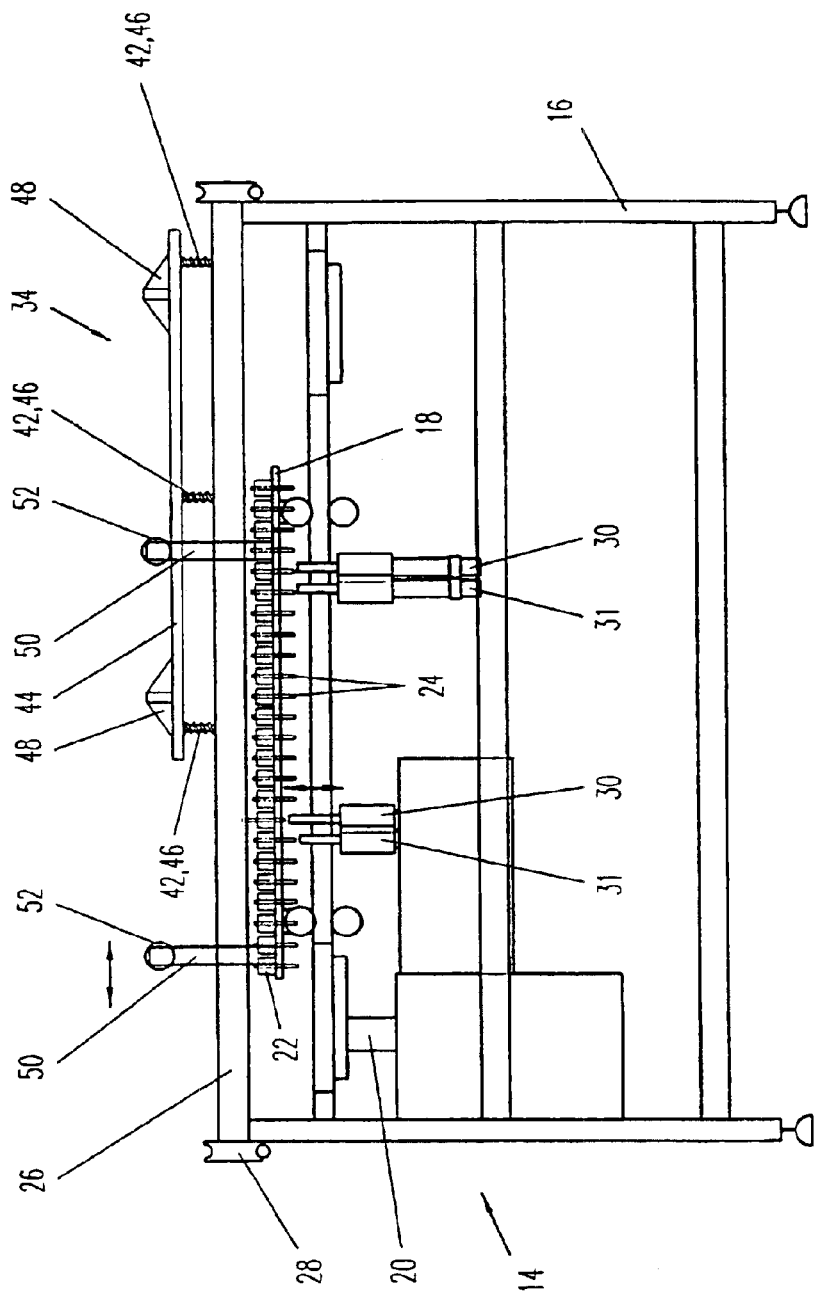
FIG. 2 the device of FIG. 1 in the section along 2—2.

In the embodiment shown in FIGS. 1 and 2, a number of diversion segments 22 are housed across the direction of transport (Y-direction) in the carriage 18 in an extendable and retractable manner. In FIG. 1 the diversion segments 22' are extended in order to push the bottles 10' off the conveyor belt 12. In the end area of each diversion segment 22 facing away from the conveyor belt, a pin 24 is housed vertically displaceable between a lower, non-activated and an upper, activated position (FIG. 2). In its activated position, each pin 24 is coupled with a rail 26, which has a C profile, open downwards, which runs parallel to the conveyor belt 12 and can be moved across it using a Y-drive 28, which also contains a stepped or servomotor. The rail 26 is also guided in the frame 16. Arranged roughly in the middle in X-direction in the frame 16 is an activator 30, in the form of an air nozzle, which, by means of an air jet strikes a plate-shaped enlargement (not shown) at the lower end of the pins 24 and forces the pins out of the non-activated position upwards into the activated position.

Furthermore, a deactivator 34 is also provided which pushes all the pins 24 into the non-activated position after a diversion process. The pins 24 are held in the de-activated position by permanent magnets until they are selectively forced by the activator 30 into the activated position in which they are again held by the permanent magnets. In the embodiment shown, the deactivator 34 contains a deactivating rail, arranged inside the C profile of the rail 26, which cannot be recognised in the drawing. This deactivation rail is arranged inside the right-hand half of the rail 26, i.e. inside the at-rest position of the carriage 18. It is firmly connected, by spacer pins 42 which run through openings in the top of the rail 26, to an auxiliary rail running above the rail 26 and parallel to it. The deactivation rail and the auxiliary tail 44 are pushed upwards by screw compression springs 46, the screw compression springs 46 resting against the upper side of the rail 26. On the upper side of the auxiliary rail 44, a ramp 48 is located in each end-area. Housed at both ends of the carriage 18 via arms 50 are rollers 52 which, in the at-rest position of the carriage 18 on the right-hand side in FIG. 1, run against the ramps 48 and thereby press the auxiliary rail 44, and the deactivation rail connected firmly to it, downwards. The arrangement is designed so that, in the extreme right-hand position of the carriage 18, the rollers 52 stand at the highest point of the ramps 48.

At the beginning of a diversion process the carriage 18 in FIG. 1 is located in the right-hand position and all the diversion segments 22 are completely retracted. The pin 24 of the first diversion segment 22/1 is located above the activator 30. On the return movement which begins (to the left in FIG. 1), all the pins 24 of the individual diversion segments 22 pass over the activator 30 in succession. The activator 30 is controlled, on the basis of the already-existing information about the bottles 10' to be diverted, such that the diversion segments 22' located at the level of the bottles 10' to be diverted on the subsequent forward or diversion movement of the carriage 18 are pressed upwards into the activated position so that they project into the C profile, open downwards, of the rail 26. When all the pins 24 have travelled over the activator 30, the carriage 18 is located in its starting position for the actual diversion movement, i.e. the left hand position in FIG. 1. From this starting position, the carriage 18 is firstly accelerated to the speed of the conveyor belt 12 so that it runs along synchronously with the conveyor belt 12. As soon as this speed is achieved, the rail 26 is moved by the Y-drive at increasing speed in Y-direction, all the activated diversion segments 22' being extended simultaneously so that the whole group of bottles located alongside the carriage is gripped at the same time and all the bottles of this group that are to be diverted are diverted at the same time. The bottles 10' located at the level of these diversion segments 22' are thereby pushed off the conveyor belt 12 simultaneously, in the present case onto a diversion belt 38 which is moved at a small distance parallel to the conveyor belt 12 and at roughly the same speed. At the end of the extension movement the speed of the rail 26 is slowed down again by the appropriate control of the Y-drive 28 so that the bottles 10 are diverted as a whole on a smooth curve. The carriage 18 is then moved further on synchronously with the conveyor belt 12, while the extended diversion segments 22' are retracted again. This retraction movement can occur at high speed. The length of the section along which the carriage 18 is moved synchronously with the conveyor belt 12 is thus shorter than the distance between the first and last diversion segment 22/1 or 22/n on the carriage 18 plus the minimum distance between two successive bottles. After the complete retraction of the previously extended, activated diversion segments 22', these are then again brought by the deactivator 34 into their non-activated position, in which they are no longer engaging with the rail 26 when the latter is released again by the deactivator 34. The carriage 18 is now located in the at-rest position again and is ready for the next diversion process, those diversion segments 22', which are later located at the level of the bottles 10' to be diverted, being firstly activated again during the return movement.

In practice, it is advisable to use one or more further activators 31 to be able to already introduce the return movement before the information is available concerning all the bottles 10 of the next group as to which bottles 10' are to be diverted. These further activators 31 are crossed later during the return movement so that, for the diversion segments 22 concerned, the information regarding any activation need only be available correspondingly later. In addition, in the embodiment shown, the activators are each arranged in pairs, one activator 30 being allocated to the even-numbered diversion segments 22 and the other activator 31 being allocated to the odd-numbered diversion segments 22.

Figure 3:
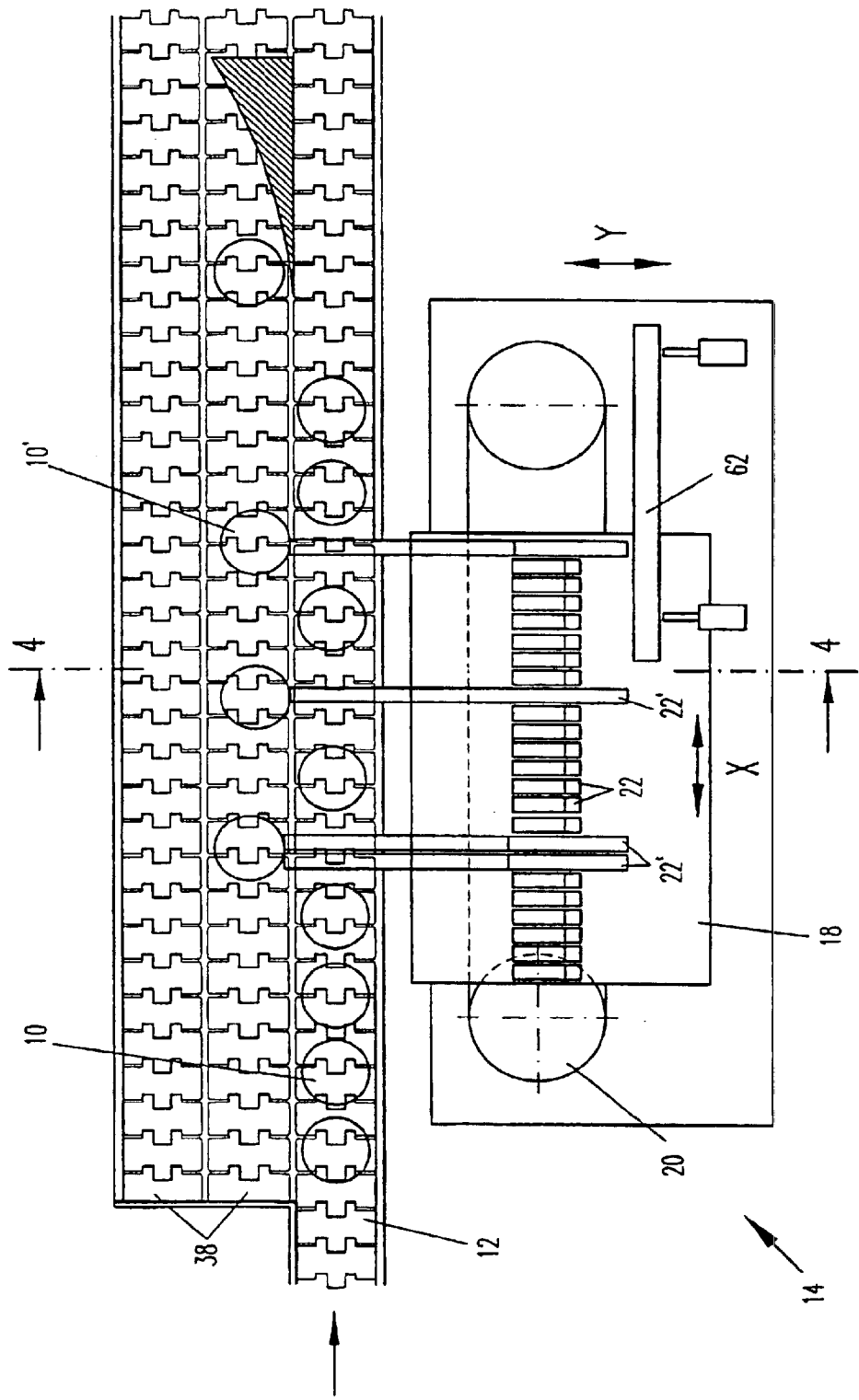
FIG. 3 in plan view an embodiment of the device with foldable diversion segments and FIG. 4 the device of FIG. 4 in section along 4—4.
Figure 4:
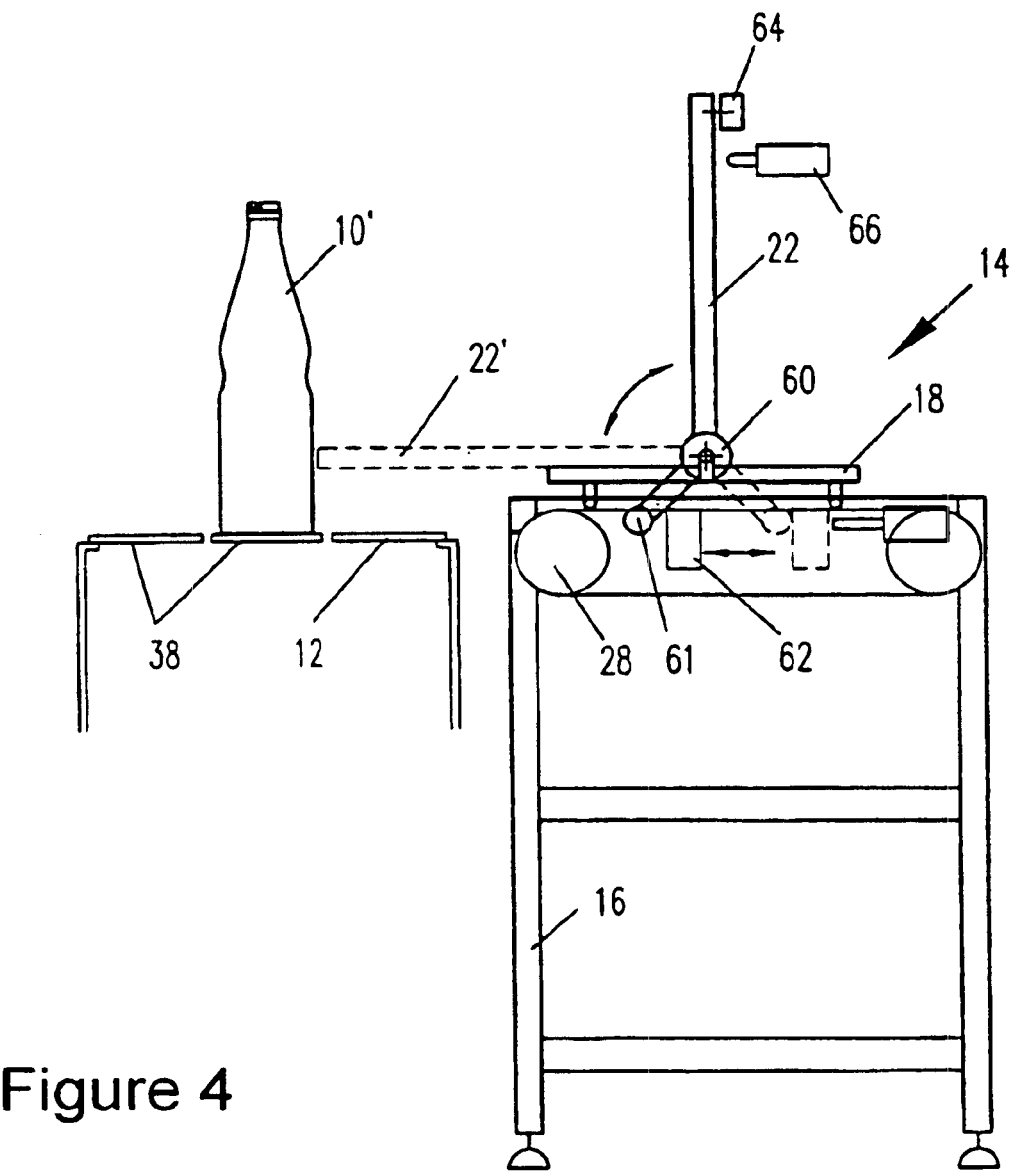

In the embodiment shown in FIGS. 3 and 4, the diversion segments 22 are developed as fingers which can be swivelled about an axis 60 between a deactivated, vertically upward-directed position, and an activated, horizontal position. The diversion segments 22 are extended downwards via the axis 60 in the form of short, bending levers 61. The axis 60 is mounted on the carriage 18 and can be moved back and forth in Y-direction. By means of a deactivation rail 62 which is housed swivellable underneath the axis 60 in Y-direction and engages with the ends of the levers 61, all the diversion segments 22 can be folded upwards into the deactivated position. Permanent magnets 64 hold the diversion segments 22 in their deactivated position. For activation, the diversion segments 22 are detached from the permanent magnets by air jets 66 and under their own weight, the diversion segments 22 fold downwards into their horizontal, activated position in which they lie on a guide rail (not shown) which has a guide groove for each diversion segment 22.

The diversion device 14 is controlled essentially as in the embodiment of FIGS. 1 and 2. At the beginning of a diversion process, the carriage 18 is located in the down-movement end-position and the axis 60 and the deactivation rail 62 in their withdrawn positions and all the diversion segments 22 are deactivated. As soon as a drinks bottle 10' that is to be diverted approaches the diversion device 14 on the conveyor belt 12, the carriage 18 travels against the direction of transport into its up-movement end-position. Upon this return movement, all the diversion segments 22 travel past the stationary air nozzle 66 and the diversion segments 22' required for the subsequent diversion process are activated by being released from the permanent magnet 64 by a short air-jet pulse so that they fold down into the horizontal. When the first bottle 10' that is to be diverted is positioned at the level of the front end of the field of diversion segments, the carriage 18 is accelerated to approximately the speed of the conveyor belt 12 and the axis 60 is moved forward synchronously to this to the conveyor belt 12. The activated diversion segments 22' thereby move across the conveyor belt 12 and push the bottles 10' concerned off the conveyor belt 12 onto the diversion belt 38. At the end of the diversion movement of the carriage 18, the axis 60 is returned again. The deactivation rail 62 then travels briefly forward and backward and lays the activated diversion segments 22' against the permanent magnets 64, so that all the diversion segments 22 are deactivated again. The diversion movement is thus concluded and the diversion device is located in its initial position again and is ready for the next diversion operation.

List of Reference Numbers 10 drinks bottles
12 conveyor belt
14 diversion device
16 frame
18 carriage
20 x-drive
22 diversion segment
24 pin(s)
26 rail
28 y-drive
30 activator
34 deactivator
38 diversion belt
42 spacer pin
44 auxiliary rail
46 screw compression spring
48 ramp
50 arm
52 rolls
60 axis
61 lever
62 deactivation rail
64 permanent magnets
66 air nozzles

What is claimed is:

1. A method for diverting items which are transported on a conveyor at a pre-set transport speed, the items to be diverted being pushed off the conveyor by means of a diversion device which has one or more diversion segments, which can be moved synchronously with the conveyor for a section and can be individually extended or retracted across the direction of transport, wherein the diversion segments are arranged side by side in the direction of transport in a carriage the carriage can be moved to and fro in the direction of transport the length of the section along which the carriage moves with the conveyor is shorter than the distance between the first and the last of the diversion segments inside the carriage, by the section along which the conveyor moves on during the backward movement of the carriage, and the items are pushed in groups off the conveyor, each group beginning with a first item to be diverted and including the items to be diverted which follow the first item to be diverted within a section the length of which equals the length of the accompanying movement of the carriage with the conveyor.

2. A device for diverting items which are transported on a conveyor in a direction of transport, the device comprising:

a carriage which is adapted to be moved to and fro in the direction of transport and to be accelerated to the speed of the conveyor; and at least one diversion segment which is guided in the carriage to be extendable and retractable across the direction of transport in order to push an item off the conveyor, the at least one diversion segment being adapted to be extended as soon as the carriage has reached the speed of the conveyor so that the at least one diversion segment is operating synchronously with the conveyor.

3. The device according to claim 2, wherein the carriage is controlled such that it runs by a to and fro action for a section roughly synchronously with the conveyor, the length of the section along which the carriage runs roughly synchronously with the conveyor, being shorter than the distance between the first and the last of the diversion segments guided in the carriage plus the minimum distance between the items.

4. The device according to claim 2, wherein a plurality of diversion segments is guided in the carriage, each of the diversion segments is individually activatable and the activated diversion segments are adapted to be extended simultaneously so that a plurality of items can be diverted simultaneously.

5. The device according to claim 4, further comprising a movable rail which can be moved across the direction of transport, with which the diversion segments can be selectively coupled individually.

6. The device according to claim 5, wherein the rail is moved by a stepped or servomotor.

* * * * *